(12) United States Patent
Hoyle et al.

(10) Patent No.: US 9,279,489 B2
(45) Date of Patent: Mar. 8, 2016

(54) VEHICLE TRANSMISSION

(75) Inventors: David John Hoyle, Wistaston (GB);
Simon James Peter Evans, Wrexham (GB)

(73) Assignee: JCB Transmissions, Uttoxeter (GB)

( * ) Notice: Subject to any disclaimer, the term of this patent is extended or adjusted under 35 U.S.C. 154(b) by 801 days.

(21) Appl. No.: 12/570,189

(22) Filed: Sep. 30, 2009

(65) Prior Publication Data

US 2010/0084213 A1 Apr. 8, 2010

(30) Foreign Application Priority Data

Sep. 30, 2008 (GB) .................................. 0817825.3

(51) Int. Cl.
| | |
|---|---|
| F16H 47/00 | (2006.01) |
| F16H 3/08 | (2006.01) |
| F16H 47/06 | (2006.01) |
| F16H 3/093 | (2006.01) |
| F16H 45/02 | (2006.01) |

(52) U.S. Cl.
CPC ................ F16H 47/06 (2013.01); F16H 3/093 (2013.01); F16H 45/02 (2013.01); *F16H 2003/0935* (2013.01); *Y10T 74/19158* (2015.01)

(58) Field of Classification Search
CPC ............ F16H 45/02; F16H 2045/0284; F16H 2045/021; F16H 2045/0231; F16H 2045/002; F16H 3/093; F16H 2003/0935; F16H 47/06; Y02T 10/76
USPC ............. 74/329, 330, 331, 340, 730.1, 731.1, 74/732.1
See application file for complete search history.

(56) References Cited

U.S. PATENT DOCUMENTS

| | | | | |
|---|---|---|---|---|
| 2,642,168 | A | | 6/1953 | Black et al. |
| 2,772,581 | A | * | 12/1956 | Maier et al. ................... 74/730.1 |
| 2,881,641 | A | * | 4/1959 | Lammerz ...................... 74/730.1 |
| 2,897,690 | A | * | 8/1959 | Maier .............................. 74/720 |
| 3,080,772 | A | * | 3/1963 | Foerster ........................... 475/54 |
| 3,426,618 | A | * | 2/1969 | Hau ................................. 475/54 |

(Continued)

FOREIGN PATENT DOCUMENTS

| | | |
|---|---|---|
| DE | 2904062 A1 | 8/1980 |
| DE | 250161 A1 | 9/1987 |

(Continued)

OTHER PUBLICATIONS

GB Examination Report, dated Apr. 2, 2012, in European Patent Application No. GB0817825.3, a related application, 3 pp.

(Continued)

*Primary Examiner* — Ha D Ho
(74) *Attorney, Agent, or Firm* — Lathrop & Gage LLP

(57) ABSTRACT

A vehicle transmission comprising a multi-ratio gearbox having a gearbox input shaft and a gearbox output shaft, the gearbox being operable to provide a driving connection between the gearbox input shaft and the gearbox output shaft at a selected one of a plurality of gear ratios, a torque converter having a torque converter input for connection to an engine, and a torque converter output driveably connected to the torque converter input by fluid coupling within the torque converter, a first driving connection between the torque converter output and the gearbox input shaft, a second driving connection between the torque converter input and the gearbox input shaft, and a selection means to select one of the first driving connection and the second driving connection.

21 Claims, 6 Drawing Sheets

(56) References Cited

U.S. PATENT DOCUMENTS

| | | | | |
|---|---|---|---|---|
| 3,426,622 | A * | 2/1969 | Tuck | 74/718 |
| 3,442,155 | A * | 5/1969 | Clark | 74/720 |
| 3,577,805 | A * | 5/1971 | Ohno et al. | 475/55 |
| 3,890,855 | A | 6/1975 | Reenskoug | |
| 4,036,081 | A * | 7/1977 | Onuma et al. | 475/56 |
| 4,159,654 | A * | 7/1979 | Hattori | 74/331 |
| 4,296,645 | A * | 10/1981 | Jameson | 475/52 |
| 4,304,150 | A * | 12/1981 | Lupo et al. | 475/51 |
| 4,784,019 | A * | 11/1988 | Morscheck | 74/720 |
| 4,860,861 | A * | 8/1989 | Gooch et al. | 192/3.26 |
| 5,507,372 | A * | 4/1996 | Boardman et al. | 192/3.31 |
| 5,685,404 | A * | 11/1997 | Fukushima | 192/3.26 |
| 5,782,326 | A * | 7/1998 | Souza | 192/3.26 |
| 6,045,477 | A * | 4/2000 | Schmidt | 475/207 |
| 6,186,029 | B1 * | 2/2001 | McQuinn | 74/718 |
| 6,244,401 | B1 * | 6/2001 | Maienschein et al. | 192/3.3 |
| 6,484,607 | B2 * | 11/2002 | Shichinohe et al. | 74/730.1 |
| 6,494,805 | B2 * | 12/2002 | Ooyama et al. | 475/207 |
| 6,508,345 | B1 * | 1/2003 | Yoshimoto et al. | 192/3.25 |
| 6,659,901 | B2 * | 12/2003 | Sakai et al. | 475/218 |
| 7,070,534 | B2 * | 7/2006 | Pelouch | 475/214 |
| 7,707,910 | B2 * | 5/2010 | Klement | 74/730.1 |
| 8,245,826 | B2 * | 8/2012 | Ohashi et al. | 192/3.22 |
| 8,360,914 | B2 * | 1/2013 | Ohashi et al. | 475/59 |
| 8,413,546 | B2 * | 4/2013 | Ohashi et al. | 74/720 |
| 2001/0008198 | A1 * | 7/2001 | Maienschein et al. | 192/3.29 |
| 2001/0020402 | A1 * | 9/2001 | Shichinohe et al. | 74/730.1 |
| 2002/0125093 | A1 * | 9/2002 | Maienschein et al. | 192/3.3 |
| 2007/0167274 | A1 * | 7/2007 | Petrzik et al. | 476/10 |

FOREIGN PATENT DOCUMENTS

| | | |
|---|---|---|
| DE | 10 2004 008678 A1 | 9/2005 |
| DE | 10 2004 059734 A1 | 6/2006 |
| DE | 10 2005 052889 A1 | 5/2007 |
| EP | 1 348 889 | 10/2003 |
| GB | 2304834 A | 3/1997 |
| JP | 2003-13998 | 1/2003 |
| WO | 2006/061054 | 6/2006 |

OTHER PUBLICATIONS

EP 09171358, Search Report, Dec. 16, 2009.

* cited by examiner

VEHICLE TRANSMISSION

CROSS-REFERENCE TO RELATED APPLICATIONS

This application claims priority under 35 USC 119 (a)-(d) to United Kingdom Patent Application No. 0817825.3 filed on Sep. 30, 2008, which is incorporated by reference in its entirety herein

BACKGROUND OF THE INVENTION

This invention relates to a vehicle transmission, particularly but not exclusively for material handling vehicles.

It is known to provide vehicle transmissions, particularly automatic transmissions, and otherwise mechanical transmissions for vehicles where engine load is likely to be highly variable such as material handling vehicles, with a torque converter. The torque converter provides a fluid coupling between the engine and the mechanical transmission which accommodates a variable load and also provides a degree of torque multiplication when the engine speed is higher than the transmission speed for example, when the vehicle is starting to move or is otherwise under load.

The presence of a torque converter can however be disadvantageous in some circumstances. At speed, where the engine speed generally matches the transmission speed, the torque converter only operates at 90 to 95% efficiency, at the maximum, the remainder of the power being converted to heat within the torque converter. When a vehicle is driven through a torque converter encounters, for example, a hill, the efficiency of the torque converter will fall as the difference between the engine speed and the vehicle speed increases, resulting in the vehicle slowing down in an undesirable manner.

To overcome these problems it is known to provide some means of locking the torque converter, such as an internal clutch as shown in our earlier application number GB 2389155. To solve the problem of the vehicle travelling along a road at a relatively high speed, it has also been proposed to bypass the torque converter to provide an additional top gear available when the highest gear transmission has already been selected, as shown in our earlier application number GB 2304834.

The known solutions are however not completely satisfactory. The use of an internal lock up clutch is constrained by the available volume within the torque converter casing, imposes significant manufacturing costs, and in general has a limited capacity since only one clutch plate is provided. It is possible to provide more plates with still greater manufacturing costs and complexity. In addition, the internal clutch must be operated by high fluid flows within the torque converter.

An aim of the present invention is to reduce or overcome one or more of the advance problems.

SUMMARY OF THE INVENTION

According to a first aspect of the invention, we provide a vehicle transmission comprising a multi-ratio gearbox having a gearbox input shaft and a gearbox output shaft, the gearbox being operable to provide a driving connection between the gearbox input shaft and the gearbox output shaft at a selected one of a plurality of gear ratios, a torque converter having a torque converter input for connection to an engine, and a torque converter output driveably connected to the torque converter input by fluid coupling within the torque converter, a first driving connection between the torque converter output and the gearbox input shaft, a second driving connection between the torque converter input and the gearbox input shaft, and a selection means to select one of the first driving connection and the second driving connection.

The one of the plurality of gear ratios and the one of the first driving connection and second driving connection may be selected independently. By "may be selected independently", we mean that the selected one of the plurality of gear ratios, and the selected one of the first driving connection and the second driving connection are selected separately, and the selection of one of the driving connections does not constrain the selection of the selected one of the plurality of gear ratios, and vice versa.

In one embodiment, the second driving connection may comprise a connection to a casing of the torque converter. The second driving connection may also comprise a first gear carried on a shaft connected to the casing of the torque converter.

In one embodiment, the first driving connection may comprise a torque converter output shaft drivingly connected to the torque converter output. The shaft connected to the casing of the torque converter may comprise a sleeve shaft disposed coaxially with the torque converter output shaft. The second driving connection may comprise a lay shaft disposed alongside the torque converter output shaft.

A second gear and a third gear may be mounted on the lay shaft, the second gear being in mesh with the first gear, and a fourth gear may be provided on the torque converter output shaft in mesh with the third gear. The selection means may comprise a clutch mounted on the lay shaft to driving connect one of the second gear and third gear to the lay shaft.

The first driving connection may comprise a gear supported on the torque converter output shaft in mesh with a first gearbox input gear supported on the gearbox input shaft and the second driving connection may comprise a second gearbox input gear supported on the gearbox input shaft and in mesh with the first gear. The selection means may comprise a clutch such that one of the first gearbox input gear and second gearbox input gear are clutchable to the gearbox input shaft.

An oil pump may be drivingly connected to the lay shaft. The torque converter output shaft may comprise or be directly connected to the gearbox input shaft.

A further driving connection means may be provided to provide a driving connection between the torque converter output shaft and the gearbox input shaft. The further driving connection means may comprise a further gear mounted on the torque converter output shaft gearbox and clutchable thereto.

In one embodiment, the vehicle transmission may comprise a control means operable to select one of the first driving connection and the second driving connection in response to a detected vehicle parameter. The vehicle transmission may also comprise a control means operable to select one of the plurality of gear ratios in response to a detected vehicle parameter.

According to another aspect of the invention, we provide a material handling vehicle comprising a chassis, a plurality of ground-engaging means, an engine and a material handling apparatus, wherein the material handling vehicle comprises a vehicle transmission according to the first aspect of the invention to provide a driving connection between the engine and one or more of the ground engaging means.

BRIEF DESCRIPTION OF THE DRAWINGS

The invention will now be described by way of example only with reference to the accompanying drawings.

DETAILED DESCRIPTION OF THE INVENTION

Figure 1:
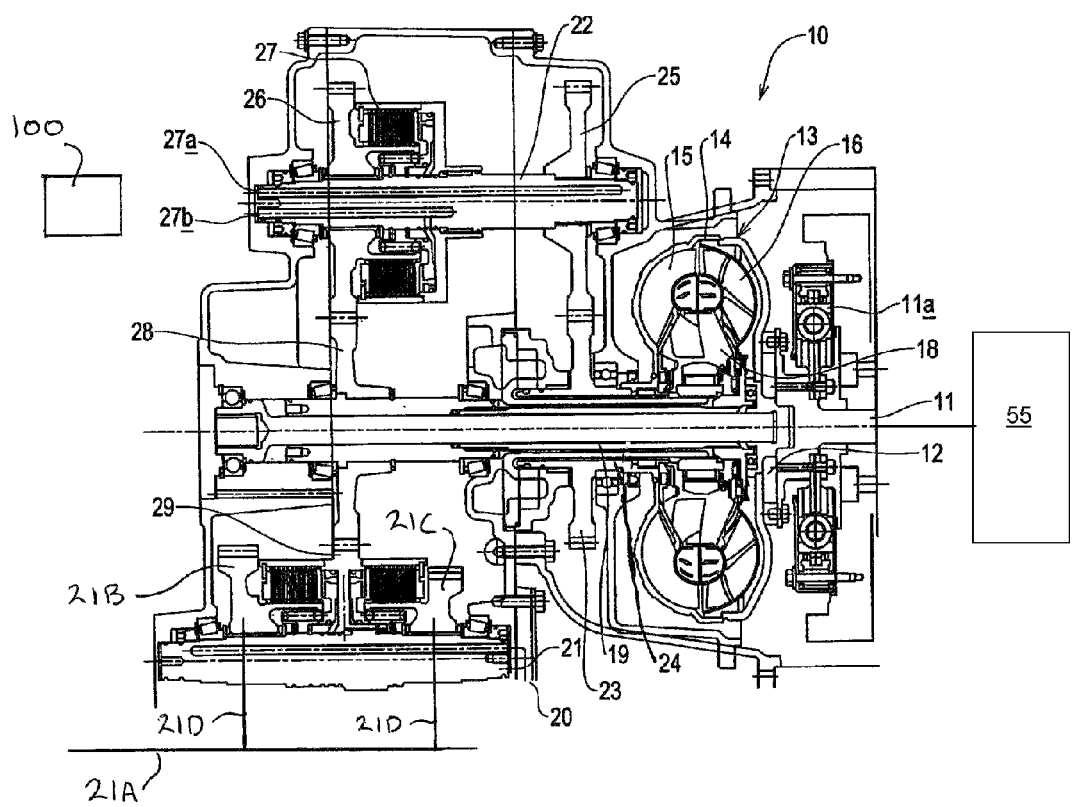
FIG. 1 is a sectional view through part of a vehicle transmission embodying the present invention.

Turning now to FIG. 1, a partial vehicle transmission is generally shown at 10. A shaft 11 connected to an engine 55 or motor via a torsional vibration damper as shown at 11a to damp high frequency fluctuations which can occur at low engine speed, to reduce the risk of consequential damage to the transmission. The shaft 11 is further connected through flange 12 to a torque converter generally shown at 13. In the present example, the end of the shaft 11 will be spigoted to the flywheel of the engine 55 and not attached directly, but it will be apparent that the torsional vibration damper can be omitted and the shaft 11 attached directly to the flywheel of an engine 55 or otherwise be directly driven by an engine 55.

In a conventional manner, the torque converter 13 comprises a casing 14 which is rotatably driven by the shaft 11. The casing 14 supports impellers 15 which direct fluid within the casing towards the blades of a turbine 16. A stator 18 is located between the impellers 15 and the turbine 16 which in a conventional manner is mounted relative to the casing 14 of the transmission 10 via a freewheel or one-way clutch. The turbine 16 is rotatable relative to the torque converter casing 14, and is connected to a torque converter output which drives a torque converter output shaft generally shown at 19. A part of a gearbox is shown at 20, the gear box 20 having a gearbox input shaft 21 and a gearbox output shaft 21A (shown schematically). The gear box 20 is operable to provide a driving connection 21 D (shown schematically) between the gearbox input shaft 21 and the gearbox output shaft at a selected one of a plurality of gear ratios. Gear 21 B defines, in part, one of the plurality of gear ratios and gear 21 C defines, in part, another of the plurality of the gear ratios.

To provide a driving connection between the torque converter 13 and the gear box 20, two driving connections are provided. A lay shaft 22 is provided supported alongside, and in this example parallel to, the torque converter output shaft 19. A first gear 23 is supported on a sleeve shaft 24 connected to the casing 14 of the torque converter 13, the sleeve shaft 24 being coaxial with and rotatable relative to the torque converter output shaft 19. The first gear 23 is in a driving connection with a second gear 25 supported by and non-rotatably connected to the lay shaft 22. A third gear 26 is rotatably supported upon the lay shaft 22. A selection means, in the present example comprising a multi-plate clutch 27, is provided to clutch the third gear 26 to the lay shaft 22 for rotation therewith. The third gear 26 is in driving mesh with a fourth gear 28 fixedly supported on the torque converter output shaft 19 for rotation therewith. In the present example, the fourth gear 28 is in driving mesh with a fifth gear 29 which is fixedly supported on the gearbox input shaft 21 of the gear box 20.

The multi-plate clutch 27 in the present example is operated by supplying a pressurised oil through the bores 27a, 27b in the lay shaft 22, but it will be apparent that any other clutch may be provided as appropriate.

To provide a first driving connection between the gear box input shaft 21 and the torque converter 13, the clutch 27 is operated such that the third gear 26 is free to rotate relative to the lay shaft 22. In this condition, the torque converter output shaft 19 is driven through fluid coupling within the torque converter 13. A driving connection between the shaft 11 and gear box input shaft 21 is provided through the torque converter 13, the torque converter output shaft 19, the fourth gear 28 and the fifth gear 29. It will be apparent that the lay shaft 22 is still driven through the first gear 23 and second gear 25, but no drive path to the gearbox 20 is established as the clutch 27 is not engaged.

When it is desired to provide a direct coupling, a second driving connection is established. The clutch 27 is engaged such that the third gear 26 is constrained to rotate with the lay shaft 22. Accordingly, a driving connection is established through the casing 14 of the torque converter 13, the first gear 23 the second gear 25, the third gear 26, the fourth gear 28 and the fifth gear 29, driving the gearbox input shaft 21. Because the torque converter output shaft 19 is effectively being constrained to rotate at the same rate as the torque converter casing 14, the torque converter 13 consequently rotates as a unit and thus direct drive is effectively provided from the shaft 11 to the gear box input shaft 21.

The gear ratio in the gearbox 20 may be selected as appropriate for the vehicle operation, and it will be apparent that the gear ratio and driving connection may be selected independently. By selected independently, we mean that the selected one of the plurality of gear ratios, and the selected one of the first driving connection and the second driving connection are selected separately, and the selection of one of the driving connections does not constrain the selection of the selected one of the plurality of gear ratios, and vice versa.

Figure 2:
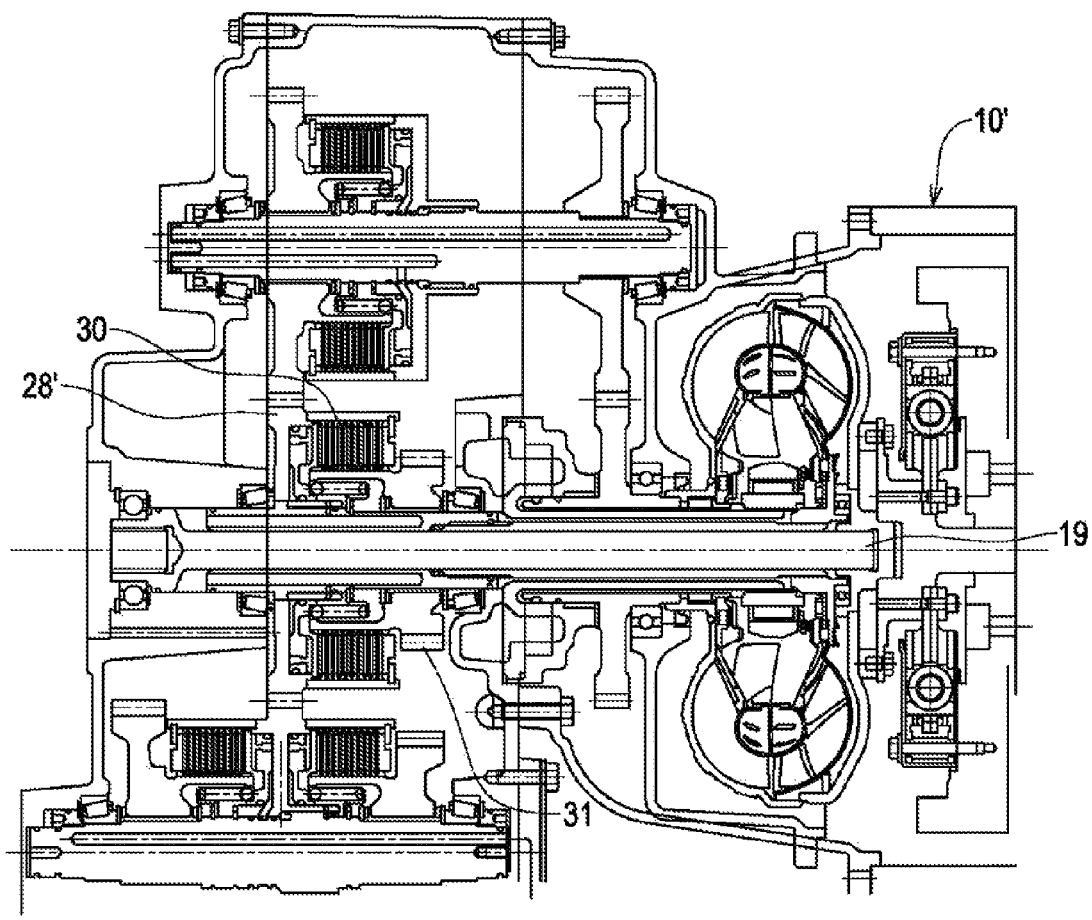
FIG. 2 is a sectional view through part of a vehicle transmission similar to the vehicle transmission of FIG. 1.

FIG. 2 shows a transmission 10' similar to that of FIG. 1, but with an further driving connection means to provide additional drive paths through the gearbox 20. Fourth gear 28' is provided fixedly mounted on shaft 19 and supports clutch 30. An additional gear 31 is provided rotatably mounted on shaft 19 and is in driving mesh with an additional input gear of the gearbox 20 (not shown). When clutch 30 is not engaged, the transmission operates in a similar manner to transmission 10. By engaging clutch 30, and operating the gearbox 20 accordingly, additional gear ratios can be provided. In the present example the transmission 10 of FIG. 1 provides four forward gear ratios and that of FIG. 2 provides six, although any appropriate number may be provided as desired.

Figure 3:
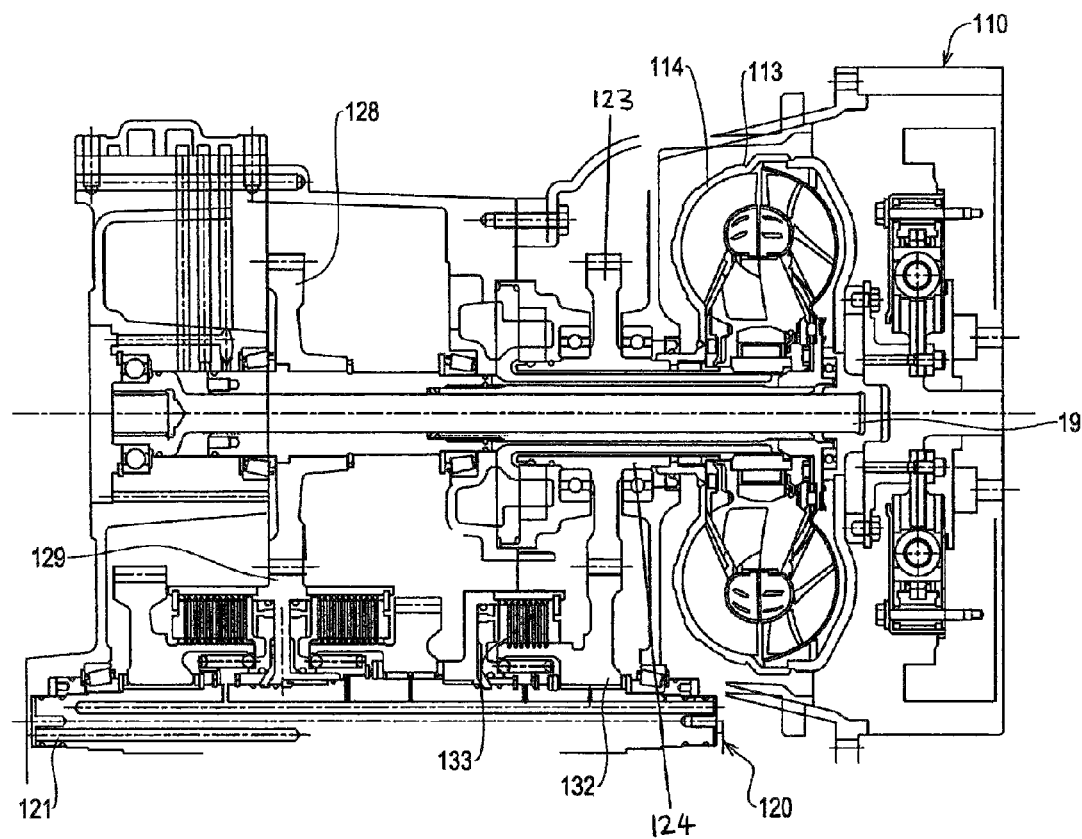
FIG. 3 is a sectional view through part of a further vehicle transmission embodying the present invention.

A further vehicle transmission is shown at 110 in FIG. 3, driving a gearbox 120. As in the transmission of FIG. 1, a shaft 111 drives a torque converter 113. Shaft 119 is driven via the torque converter turbine 116, while a sleeve shaft 124 is connected to a casing 114 of the torque converter 113. A gear 128 fixedly mounted on shaft 111 is in mesh with a first gearbox input gear 129 of the gearbox 120, while a first gear 123 is supported on the sleeve shaft 124.

The transmission of FIG. 3 differs from that of FIG. 1 in that no lay shaft is required. Instead, the gearbox 120 comprises a gearbox input shaft 121 which is relatively long compared to the gearbox input shaft 21 of FIG. 1. The gearbox input shaft 121 supports a second gearbox input gear 132 which is rotatably mounted on the gearbox input shaft 121 and is clutchable thereto by a selection means comprising input clutch 133. Alternatively, or additionally, the first gearbox input gear 129 could be rotatably supported on and clutchable to the gearbox input shaft 119. In operation, it will be apparent that as in FIG. 1, the gearbox can be driven via the torque converter through gears 128 and 129. When direct drive is required, clutch 133 is engaged such that input shaft 121 is driven through the torque converter casing 114, sleeve shaft 124, first gear 123 and second input gear 132.

Figure 4:
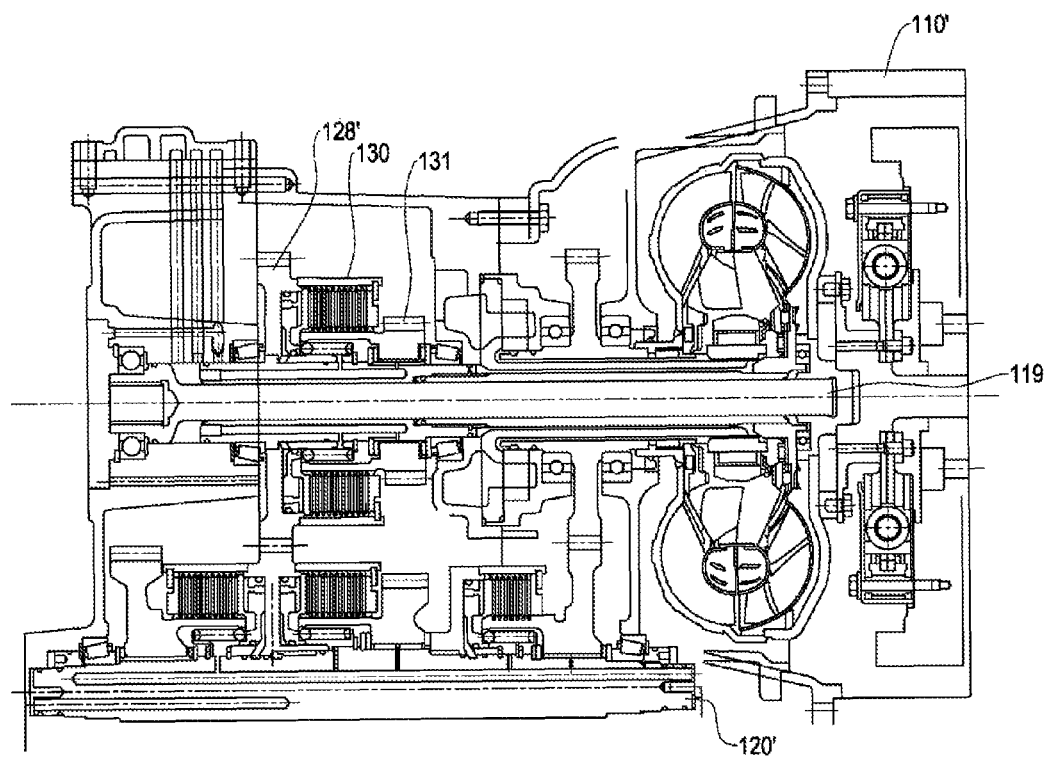
FIG. 4 is a sectional view through part of a further vehicle transmission similar to the vehicle transmission of FIG. 3.

In like manner to FIG. 2, FIG. 4 shows a vehicle transmission 110' in which additional drive paths are provided by a further driving connection means. As shown in FIG. 4, gear 128' is fixedly supported on shaft 119, and supports clutch 130. A further gear 131 is rotatably supported on shaft 119 and is clutchable thereto by clutch 130. The further gear 131 is in mesh with an additional input gear of gearbox 120'. The clutch 130 can thus be operated to engage additional drive paths as discussed above.

In the examples of FIGS. 1 to 4, the torque converter output shaft 19, 119 is distinct from, and in these particular examples, alongside, the gear box input shaft 21, 121. In the alternative example of FIG. 5, a shaft 219 is provided which extends from the torque converter 213 into a gear box generally shown at 220, and thus in this example the torque converter output shaft is either integrally provided with, or is directly attached to, the gear box input shaft. In this example, the second driving path is provided through the first gear 223, the second gear 225, the third gear 226 and fourth gear 227. The fourth gear 227 is simply mounted on shaft 219 providing the drive to the combined shaft 219, rather than providing drive to the gear box through meshing with an input gear as shown in FIG. 1.

Figure 5:
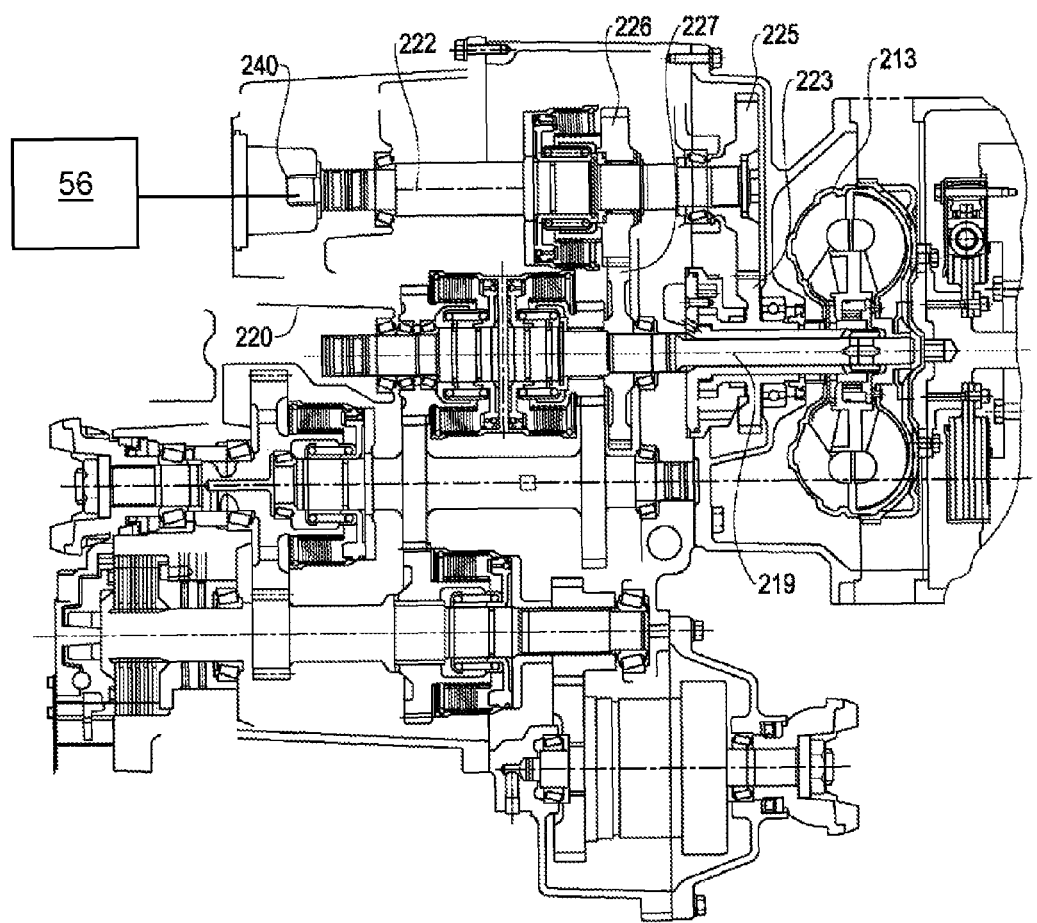
FIG. 5 is a sectional view of a further vehicle transmission embodying the present invention.

In the example of FIG. 5, an auxiliary output is generally shown at 240 where, advantageously, an oil pump 56 may be connected. As the lay shaft 22 is of course being continually driven, the conventional oil pump 56 may be driven through the connection 240 without requiring any further drive to be provided and without potentially fouling any other part of the transmission.

The selection of one of the first driving connection and second driving connection may be performed automatically or as a result of an operator control. Similarly, the selected one of the plurality of gear ratios in the gearbox 20, 120, 220 may be performed automatically or by manual selection of a desired gear, or a combination of both depending on the nature of the transmission control. Where automatic selection of the driving connection or gear ratio is provided, a suitable control means 100 (shown schematically) may be provided responsive to a vehicle operation parameter to detect when a change is need and control the clutch or clutches within the gearbox 20, 120, 220 to perform the change. The vehicle parameters may include such factors as engine speed, the gearbox output shaft speed, the vehicle ground speed, the operation of controls by the operator and the fluid pressure within a hydraulic system of the material handling apparatus.

The transmission described herein is advantageous in that the advantages of providing either of drive through fluid coupling within the torque converter 13 or direct drive without fluid coupling are available in all the available gears of the gear box. The problems of complexity and cost of manufacturing arising from providing a lock up clutch within the torque converter are removed and a standard torque converter without internal lock up clutch can be used. This also removes the need to provide internal boring within the torque converter output shaft required to provide operation of an internal lock up clutch. By providing the lock up clutch in a less constrained and more accessible position, a larger, multi-plate lock up clutch can be used compared to an internal lock-up clutch, providing a greater clutch area and thus a greater capacity, whilst still using an otherwise standard fluid operated clutch.

It will be apparent that the gear box may be any suitable gear box as desired, as the first and second driving connections are provided between a standard torque converter and the input of the gear box. The gear box may be used in any appropriate vehicle as desired.

Figure 6:
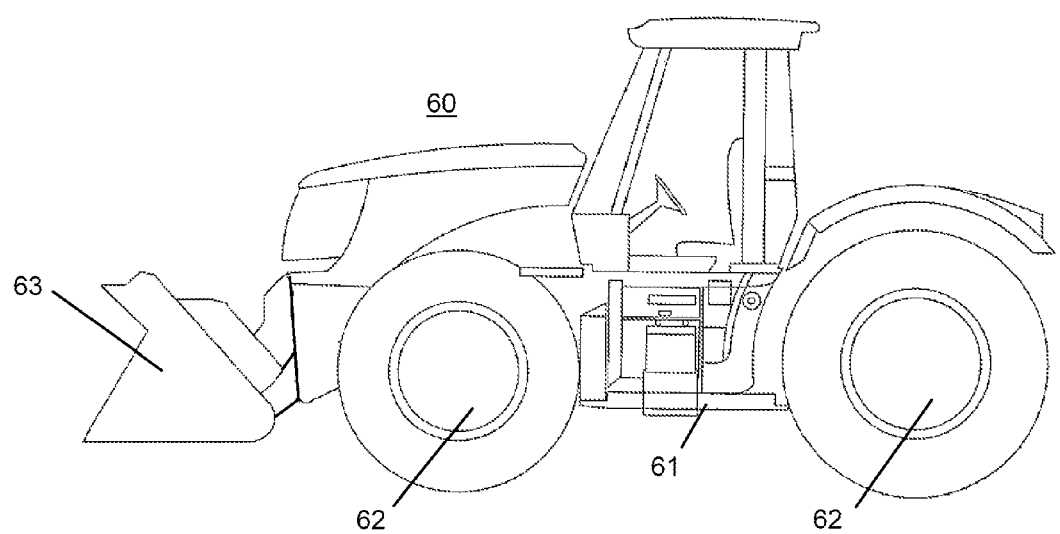
FIG. 6 illustrates a material handling vehicle comprising a vehicle transmission embodying the present invention.

In the example of material handling vehicles (60 as shown in FIG. 6), such as backhoes, bulldozers or other machines provided with a chassis 61, plurality of ground-engaging means 62, and a material handling apparatus 63, the transmission is advantageous in that the advantages of the torque converter, such as high torque at low speeds and an indirect coupling between the engine and ground engaging means such as wheels while the vehicle is operating with a highly variable load, are available, but that the torque converter may be by-passed and direct drive provided at all other times of operation. Accordingly, by providing direct drive, in general in the higher gears, and only using the fluid coupling through the torque converter when required, advantages in vehicle operation and fuel efficiency may be achieved.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

Having now fully described the present invention in some detail by way of illustration and examples for purposes of clarity of understanding, it will be obvious to one of ordinary skill in the art that the same can be performed by modifying or changing the invention within a wide and equivalent range of conditions, dimensions and other parameters without affecting the scope of the invention or any specific embodiment thereof, and that such modifications or changes are intended to be encompassed within the scope of the appended claims. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention.

All references cited herein are hereby incorporated by reference in their entirety to the extent that there is no inconsistency with the disclosure of this specification. All headings used herein are for convenience only.

The invention claimed is:
1. A vehicle transmission, comprising;
a multi-ratio gearbox having a gearbox input shaft and a gearbox output shaft, the gearbox being operable to provide a driving connection between the gearbox input shaft and the gearbox output shaft at a selected one of a plurality of gear ratios,
a torque converter having a casing with a first torque converter output, a torque converter input for connection to an engine, and a second torque converter output,
a selectable first driving connection between the second torque converter output and the gearbox input shaft, wherein the second torque converter output is driveably connected to the torque converter input by fluid coupling within the torque converter, a selectable second driving connection between the torque converter input and the gearbox input shaft, wherein the second torque converter output is mechanically constrained to rotate at the same rate as the first torque converter output so that the torque converter rotates as a unit when the second driving connection is selected, the second driving connection being defined between the torque converter and the gearbox and;

a lock up clutch able to select one of the first driving connection and the second driving connection, wherein the lock up clutch is positioned outside of the torque converter and is selectively engageable with the second driving connection so as to constrain the second torque converter output to rotate at the same rate as the first torque converter output.

2. A vehicle transmission according to claim 1 wherein the one of the plurality of gear ratios and the one of the first driving connection and second driving connection can be selected independently.

3. A vehicle transmission according to claim 1 wherein the second driving connection comprises a connection to the casing of the torque converter.

4. A vehicle transmission according to claim 3 wherein the second driving connection comprises a first gear carried on a shaft connected to the casing of the torque converter.

5. A vehicle transmission according to claim 4 wherein the first driving connection comprises a torque converter output shaft drivingly connected to the second torque converter output.

6. A vehicle transmission according to claim 5 wherein the shaft connected to the casing of the torque converter comprises a sleeve shaft disposed coaxially with the second torque converter output.

7. A vehicle transmission according to claim 5 wherein the second driving connection comprises a lay shaft disposed alongside the second torque converter output.

8. A vehicle transmission according to claim 7 wherein a second gear and a third gear are mounted on the lay shaft, the second gear being in mesh with the first gear, and wherein a fourth gear is provided on the second torque converter output in mesh with the third gear.

9. A vehicle transmission according to claim 8 wherein the lock up clutch is mounted on the lay shaft to drivingly connect one of the second gear and third gear to the lay shaft.

10. A vehicle transmission according to claim 7 wherein an oil pump is drivingly connected to the lay shaft.

11. A vehicle transmission according to claim 5 wherein the first driving connection comprises a gear supported on the second torque converter output in mesh with a first gearbox input gear supported on the gearbox input shaft and the second driving connection comprises a second gearbox input gear supported on the gearbox input shaft and in mesh with the first gear.

12. A vehicle transmission according to claim 11, whereby one of the first gearbox input gear and second gearbox input gear are clutchable to the gearbox input shaft by the lock up clutch.

13. A vehicle transmission according to claim 1 wherein the second torque converter output comprises or is directly connected to the gearbox input shaft.

14. A vehicle transmission according to claim 1 wherein a further driving connection is provided between the second torque converter output and the gearbox input shaft.

15. A vehicle transmission according to claim 14 wherein the further driving connection comprises a further gear mounted on the second torque converter output gearbox and clutchable thereto.

16. A vehicle transmission according to claim 1 comprising a control means operable to select one of the first driving connection and the second driving connection in response to a detected vehicle parameter.

17. A vehicle transmission according to claim 1 comprising a control means operable to select one of the plurality of gear ratios in response to a detected vehicle parameter.

18. A material handling vehicle comprising a chassis, a plurality of ground-engaging means, an engine and a material handling apparatus, wherein the material handling vehicle comprises a vehicle transmission according to claim 1 to provide a driving connection between the engine and one or more of the ground engaging means.

19. A vehicle transmission, comprising;
a multi-ratio gearbox having a gearbox input shaft and a gearbox output shaft, the gearbox being operable to provide a driving connection between the gearbox input shaft and the gearbox output shaft at a selected one of a plurality of gear ratios;
a torque converter having a casing with a first torque converter output, a torque converter input for connection to an engine, and a second torque converter output;
a selectable first driving connection between the second torque converter output and the gearbox input shaft, wherein the second torque converter output is driveably connected to the torque converter input by fluid coupling within the torque converter;
a selectable second driving connection between the torque converter input and the gearbox input shaft, wherein the second torque converter output is mechanically constrained to rotate at the same rate as the torque first converter output so that the torque converter rotates as a unit when the second driving connection is selected, the second driving connection being defined between the torque converter and the gearbox;
wherein the second driving connection further comprises a first gear carried on a shaft connected to the casing of the torque converter, said shaft comprising a sleeve shaft disposed coaxially with the second torque converter output; and
a lock up clutch able to select one of the first driving connection and the second driving connection, wherein the lock up clutch is selectively engageable with the second driving connection so as to constrain the second torque converter output to rotate at the same rate as the first torque converter output.

20. A vehicle transmission, comprising;
a multi-ratio gearbox having a gearbox input shaft and a gearbox output shaft, the gearbox being operable to provide a driving connection between the gearbox input shaft and the gearbox output shaft at a selected one of a plurality of gear ratios;
a torque converter having a casing with a first torque converter output, a torque converter input for connection to an engine, and a torque converter output;
a selectable first driving connection between the second torque converter output and the gearbox input shaft, wherein the second torque converter output is driveably connected to the torque converter input by fluid coupling within the torque converter;
a selectable second driving connection between the torque converter input and the gearbox input shaft, wherein the second torque converter output is mechanically constrained to rotate at the same rate as the torque first converter output so that the torque converter rotates as a unit when the second driving connection is selected, the second driving connection being defined between the torque converter and the gearbox;

wherein the second driving connection further comprises a first gear carried on a shaft connected to the casing of the torque converter and a lay shaft disposed alongside the second torque converter output, wherein a second gear and a third gear are mounted on the lay shaft, the second gear being in mesh with the first gear, and wherein a fourth gear is provided on the second torque converter output in mesh with the third gear; and a lock up clutch able to select one of the first driving connection and the second driving connection, wherein the lock up clutch is selectively engageable with the second driving connection so as to constrain the second torque converter output to rotate at the same rate as the first torque converter output.

21. A vehicle transmission according to claim 1 wherein each of the plurality of gear ratios and the one of the first driving connection and second driving connection can be selected independently.

\* \* \* \* \*